United States Patent [19]
Haight et al.

[11] 4,076,321
[45] Feb. 28, 1978

[54] ELECTRONIC CONTROL SYSTEM FOR OPERATING A PNEUMATIC TRASH LINEN CONVEYING NETWORK

[75] Inventors: Nicholas Haight, Pompton Lakes; Trygve T. Madsen, Pompton Plains, both of N.J.

[73] Assignee: Eastern Cyclone Industries, Inc., Fairfield, N.J.

[21] Appl. No.: 747,887

[22] Filed: Dec. 6, 1976

[51] Int. Cl.² .............................................. B65G 51/02
[52] U.S. Cl. ........................................ 302/27; 302/28
[58] Field of Search ....................... 302/17, 27, 28, 39; 214/1 L

[56] References Cited

U.S. PATENT DOCUMENTS

| 3,490,813 | 1/1970 | Hallstrom | 302/27 |
| 3,951,461 | 4/1976 | De Feudis | 302/28 |

FOREIGN PATENT DOCUMENTS

| 2,501,803 | 8/1975 | Germany | 302/28 |
| 227,171 | 9/1969 | Sweden | 302/39 |
| 1,084,689 | 9/1967 | United Kingdom | 302/27 |
| 1,223,279 | 2/1971 | United Kingdom | 302/17 |

Primary Examiner—Evon C. Blunk
Assistant Examiner—Jeffrey V. Nase
Attorney, Agent, or Firm—Anthony J. Casella; Joseph A. Calvaruso

[57] ABSTRACT

An electronic control system for operating a pneumatic trash and linen conveying network comprises a plurality of circuits including a control circuit, a memory circuit, a timer circuit, a damper driver circuit and a station driver circuit. The system is substantially universal for any application, each printed circuit board being identical to every other printed circuit board of the same type. Although substantially universal, the system is adaptable to particular applications by means of a programmable member in the control circuit. The system also includes a station address system, as well as a plurality of travel times, whereby utmost efficiency in operation is achieved.

6 Claims, 14 Drawing Figures

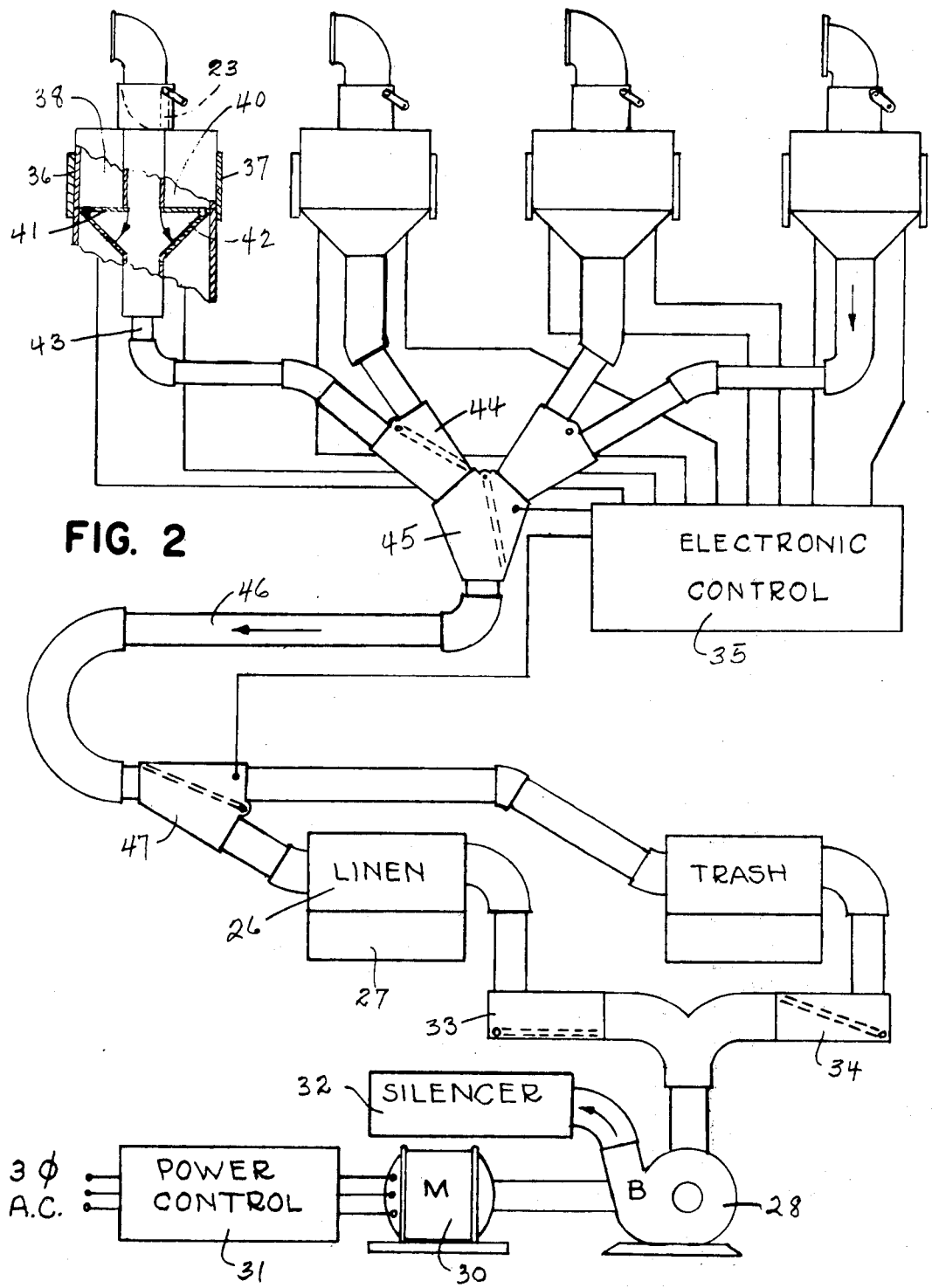

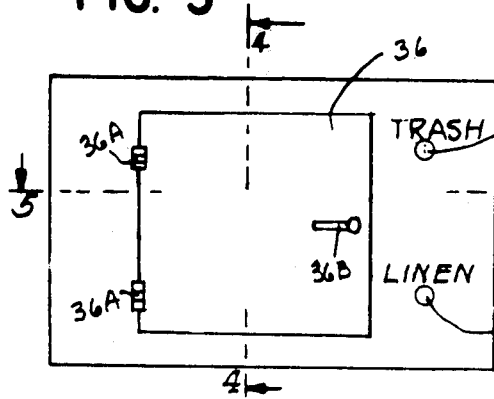
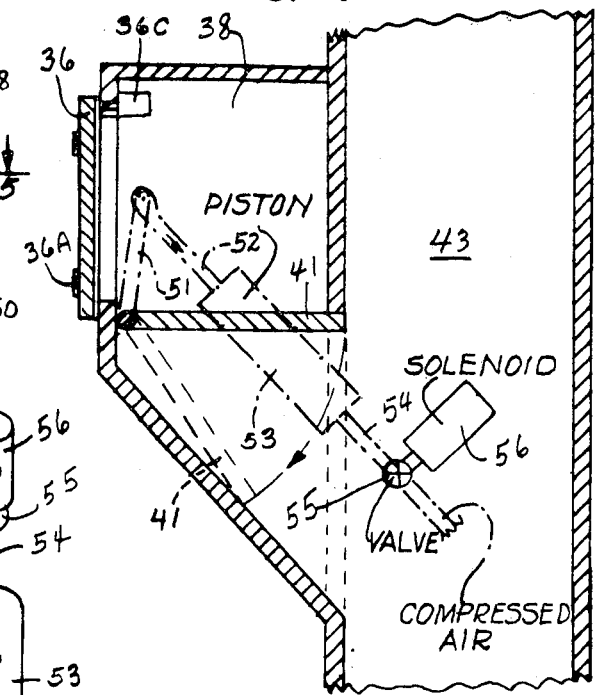
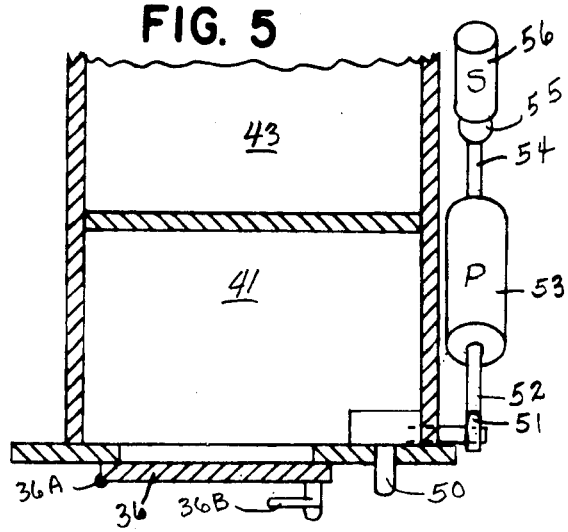
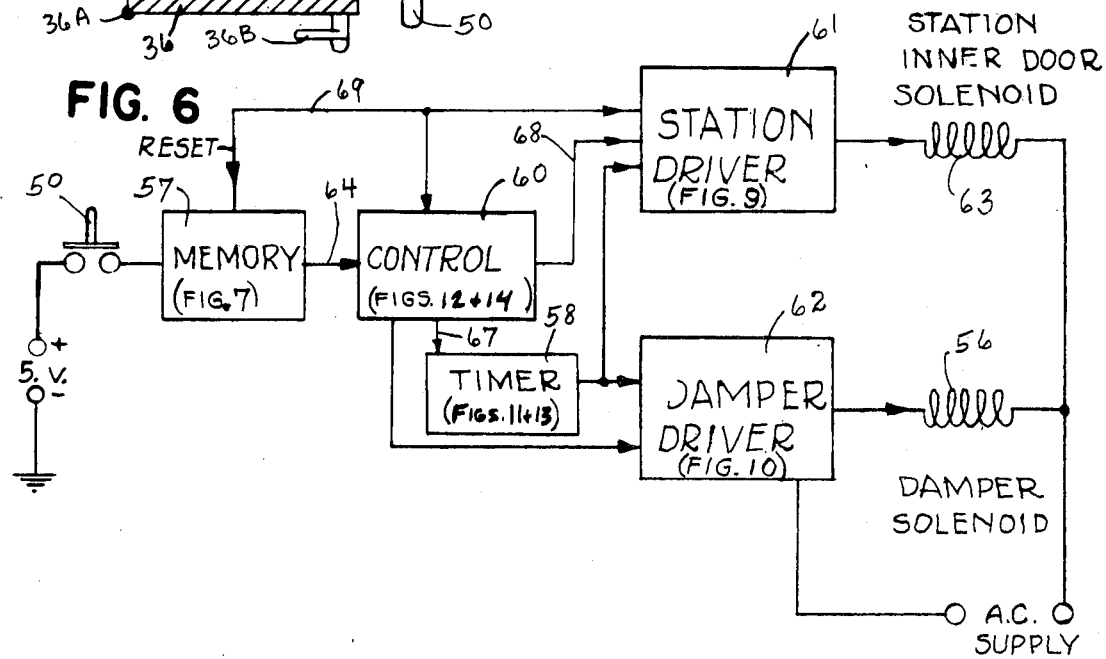

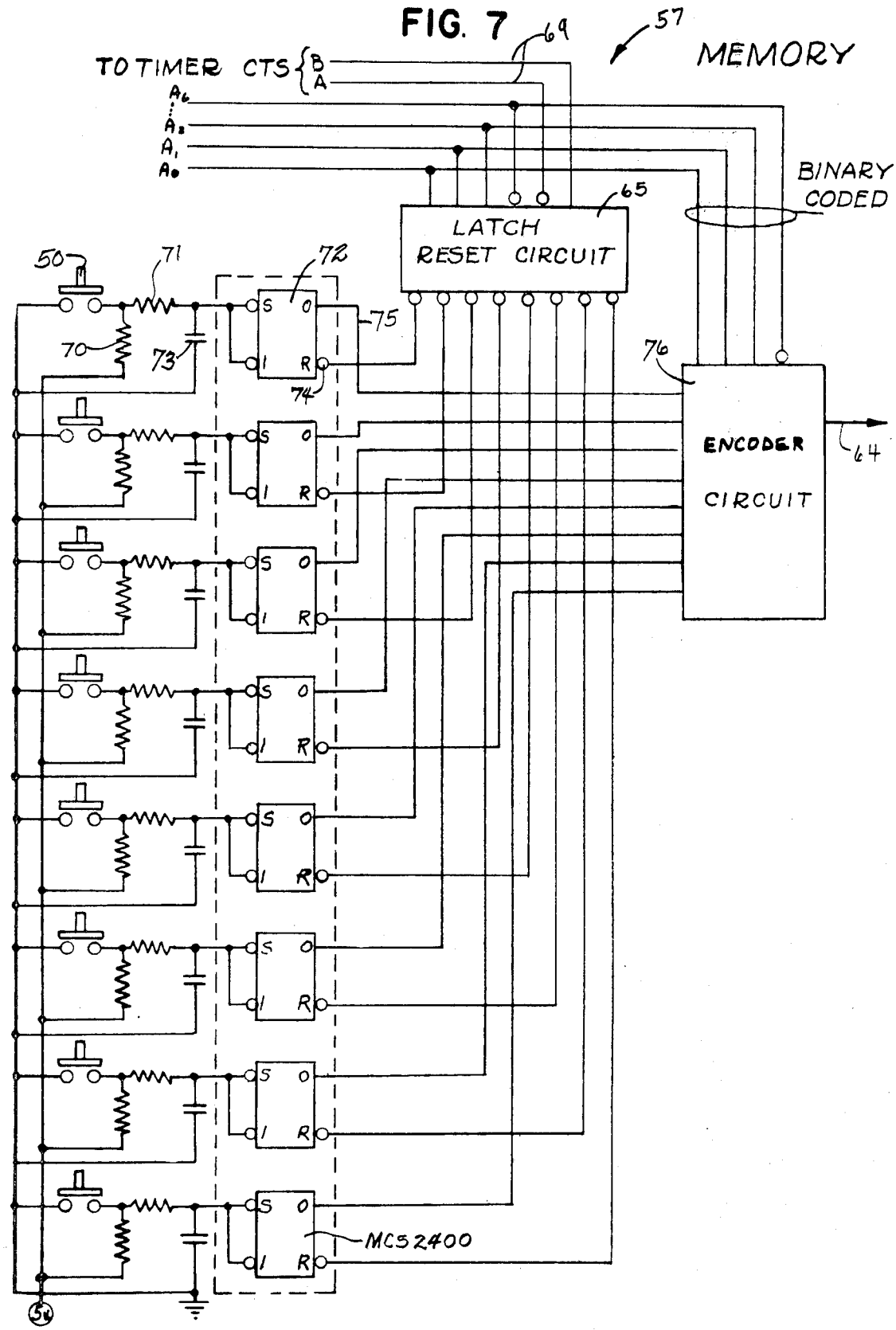

DAMPER DRIVER CIRCUIT

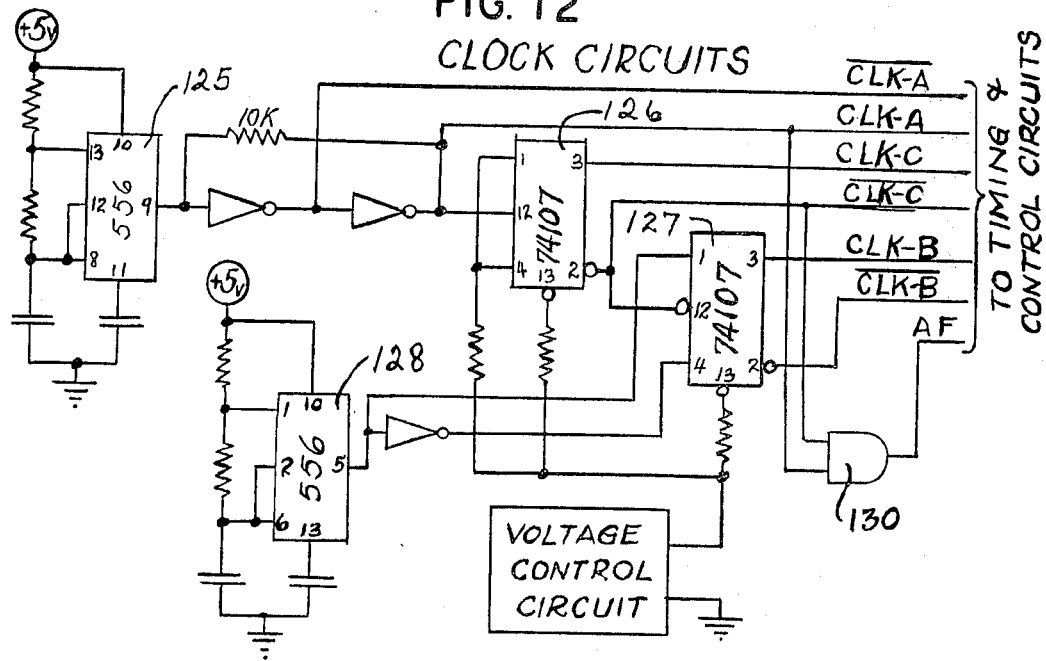
FIG. 12 CLOCK CIRCUITS
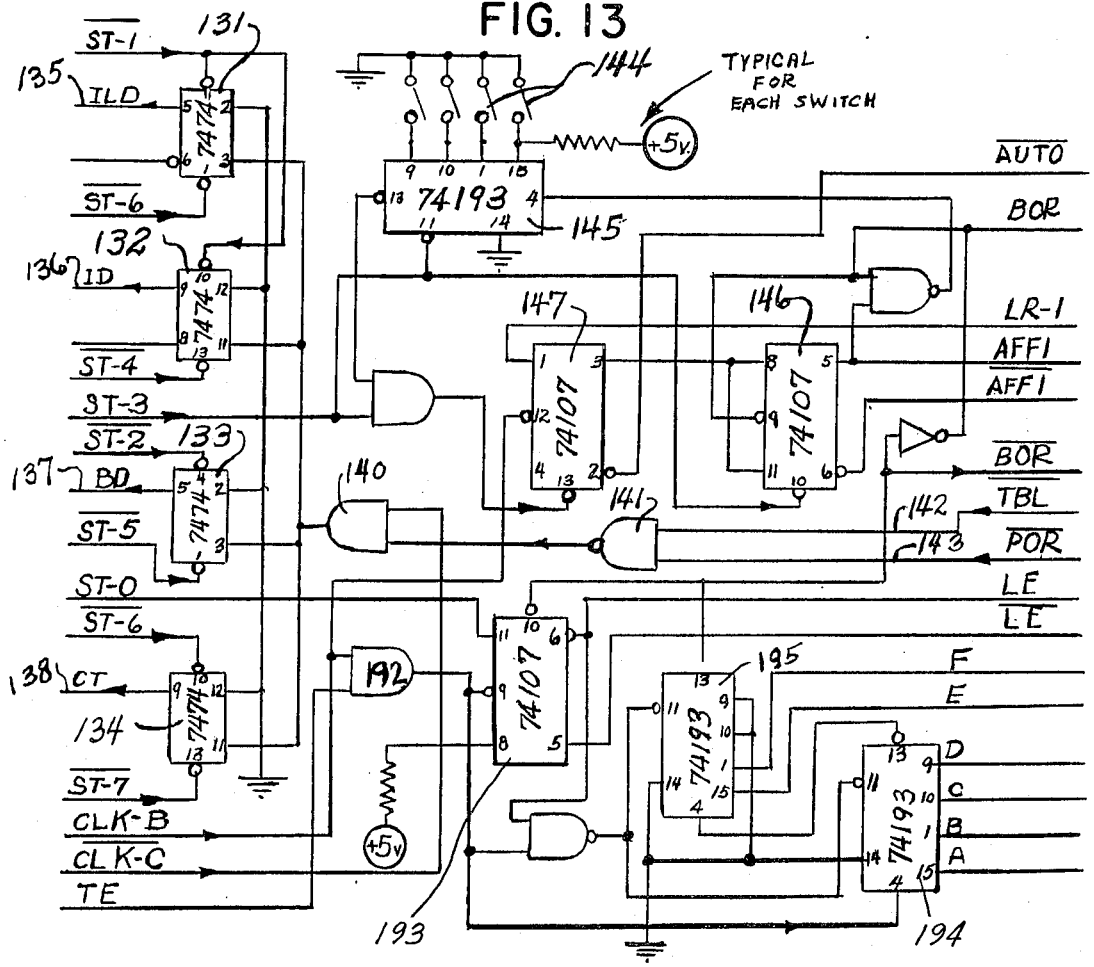
FIG. 13

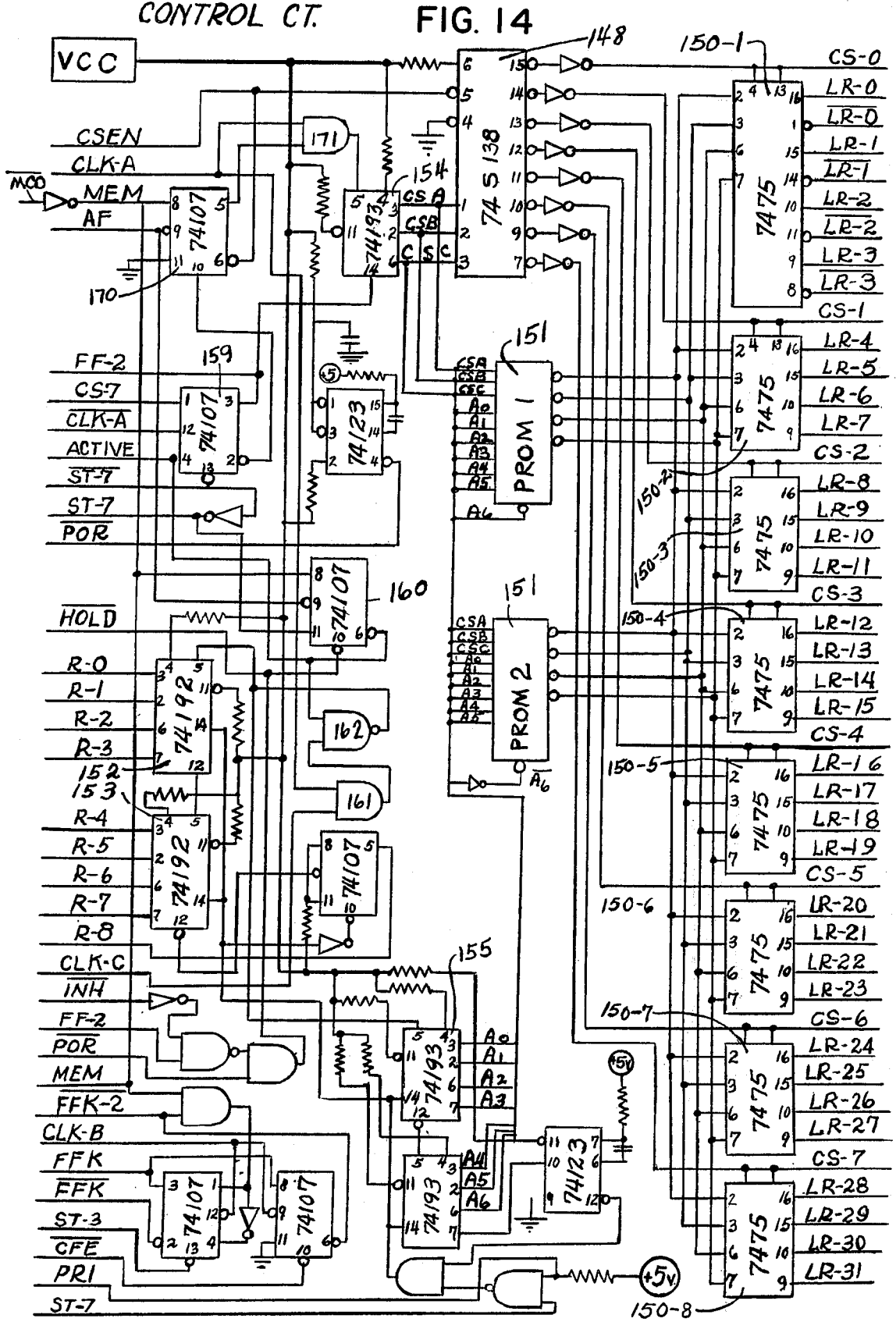

ELECTRONIC CONTROL SYSTEM FOR OPERATING A PNEUMATIC TRASH LINEN CONVEYING NETWORK

BACKGROUND OF THE INVENTION

For many years hospitals and other large buildings have handled disposal of refuse and dirty laundry by the use of mobile units such as carts or similar vehicles which are wheeled along corridors and halls, picking up bundles and then transporting them to a disposal area. This problem is present in all inhabited large buildings but is especially important in hospitals where the disposal problem is continuous, requiring a 24 hour a day operation. Also, in hospitals, there is the liability of disease reinfection which puts an added burden on the operating personnel.

A pneumatic system of chutes and mechanical controls was developed by assignors of Eastern Cyclone Industries, and described in U.S. Pat. Nos. 2,556,056, issued June 5, 1951, entitled "Pneumatic Conveyor System"; 3,208,800, issued Sept. 28, 1965, entitled "Pneumatic Conveying System For Bulky Materials"; 3,606,478, issued Sept. 20, 1971, entitled "Trash And Refuse Depository System"; and 3,847,293, issued Nov. 12, 1974, entitled "Pneumatic Trash-Garbage Pickup Device". Such systems are enclosed and electronically controlled. Once trash or linen is placed in the system's air lock depositories, it is isolated and conveyed through ducts to a centralized collection center. The refuse is never touched by human hands after it is sent on its way and soiled linen is not handled until it reaches a laundry room. Such a completely enclosed system guards against the spread of odors, staphylococci and other pathogens into hospital corridors.

The basic operation of the system described herein is powered by a large suction blower which creates a strong air flow in all the ducts and is capable of moving packages, bundles of all sizes, and individual pieces such as nurses uniforms, bed sheets and towels. The trash or linen is placed in a deposit station by a nurse or other attendant and a button is depressed. The package is then on its way at about 60 miles per hour to its final destination. Since the deposit stations are behind a stainless steel door, mounted flush with a corridor wall, the stations do not interfere with other normal traffic in the halls and do not use any of the elevator facilities. The system removes materials to a central point in the building in which it is installed or, if desired, may continue the movement to another building, outside the hospital area.

The results of this operation are many. First, trash and dirty linen are started on their way from a station near the pick-up point. Second, the speed of delivery is great, moving the packages to their destination in a few seconds. Third, the usual avenues of personnel movement; halls, stairways, and elevators are made free of carts and other carriers. Fourth, the cost of operating a hospital or other building complex is reduced. Finally, the air duct system reduces the fire hazzard since the vacuum system acts to put out any fire which may be started in the bundles.

Although such networks represent a great advance in trash and linen convey operations their speed and operating response is limited because of their mechanical controls. One known control system consists of a relay network. However, such system requires complex circuitry and a great deal of wiring, and attendant therewith increased risk of system failure after continued use. In addition, each control system has to be custom wired for each individual application, no two control systems being alike. In order to change the operation or sequence of any of the elements in the network the wires have to be changed in the field by a skilled technician. It can be appreciated that this can add substantially to the cost for a consumer. Also adding to costs is the fact that because of the amount of wiring required, the enclosures for the control panels must be quite large.

Another known control system, although using solid state circuitry, is in essence, merely a shrunken version of the relay system. The system is still custom built in that each printed circuit board used must be particularly designed for each individual application. Should modification or expansion of a system be desired, it would require a new printed circuit board specifically designed for the particular application. A printed circuit board of one system cannot be used in another different system.

It should be noted that because of the particular circuitry used, both the relay system and the known solid state system may practically use only one travel time for the conveying of packages from station to collector. It can be appreciated that this is not an efficient operating mode in that a station close to the collector should not be alloted the same travel time as that for a station disposed a substantial distance from the collector.

Accordingly, it is an object of the subject invention to provide a control system for operating a pneumatic trash and linen network which is substantially universal, the circuitry of the same type being interchangeable between systems, the circuitry further being programmable to meet the specific requirements of each individual application.

It is a further object of the subject invention to provide a control system for operating a pneumatic trash and linen network which is less costly to manufacture and maintain, and is more efficient than existing systems.

SUMMARY

The invention comprises a control system for operating a pneumatic trash and linen network which includes a plurality of cylindrical ducts connected to each other for conveying packages. A deposit station is positioned at the entrance end of each duct for receiving packages and a first collection center is connected to the duct system for the preliminary storage of packages. A second collection center is also connected to the duct system for a similar reason. Each collection center is provided with a discharge gate for unloading received packages. An evacuation pump is connected to the duct system for drawing air through the system to move the packages toward a collection center by means of air pressure. The electronic control system connects all of the deposit stations and both of the collection centers for operating deposit station door locks and for the selective and sequential action of directing packages of the first and second groups to predetermined collection centers. A countdown circuit is energized when a deposit station is operated to deliver a package to a duct and at the end of the countdown the circuit is normalized to receive another package from another deposit station. The deposit stations are coupled to the countdown circuit by means of very high impedance transistors so that the deposit station circuits do not affect the normal counting action.

In essence, the system comprises a plurality of circuits including a control circuit, a memory circuit, a timer circuit, a damper driver circuit and a station driver circuit, each circuit of the same type being interchangeable with each other. The control circuit includes a programmable member which is unique for each individual application, and which in essence tells the system how to operate. The control circuit also includes a station address system whereby station outputs can be multiplexed thus increasing the number of stations that can be handled by each individual circuit.

Additional details of the invention will be disclosed in the following description, taken in connection with the accompanying drawings.

BRIEF DESCRIPTION OF THE FIGURES

FIG. 2 is a diagrammatic view of a single system of ducts where each duct handles packages of both groups. A switching means separates the package groups prior to entering the collection containers.

FIG. 3 is a front view of one of the gates which are opened when depositing trash bags or linen packages.

FIG. 4 is a cross-sectional view of the gate shown in FIG. 3 and is taken along line 4—4 of that figure. An inner drop gate is shown coupled to a compressed air piston.

FIG. 5 is a cross-sectional view of the gate shown in FIG. 3 and is taken along line 5—5 of that figure.

FIG. 6 is a block diagram of the entire collection system, showing the general coupling means between the main parts.

FIG. 7 is a schematic wiring diagram of the memory circuit coupled between the gate push buttons and an output decoding circuit.

FIG. 12 is a wiring diagram of the clock circuits which produce timing pulses for the other control units. Six pulse trains are produced.

FIG. 13 is a wiring diagram of the second portion of the timer circuit.

FIG. 14 is a wiring diagram of the main control circuit.

Figure 1:
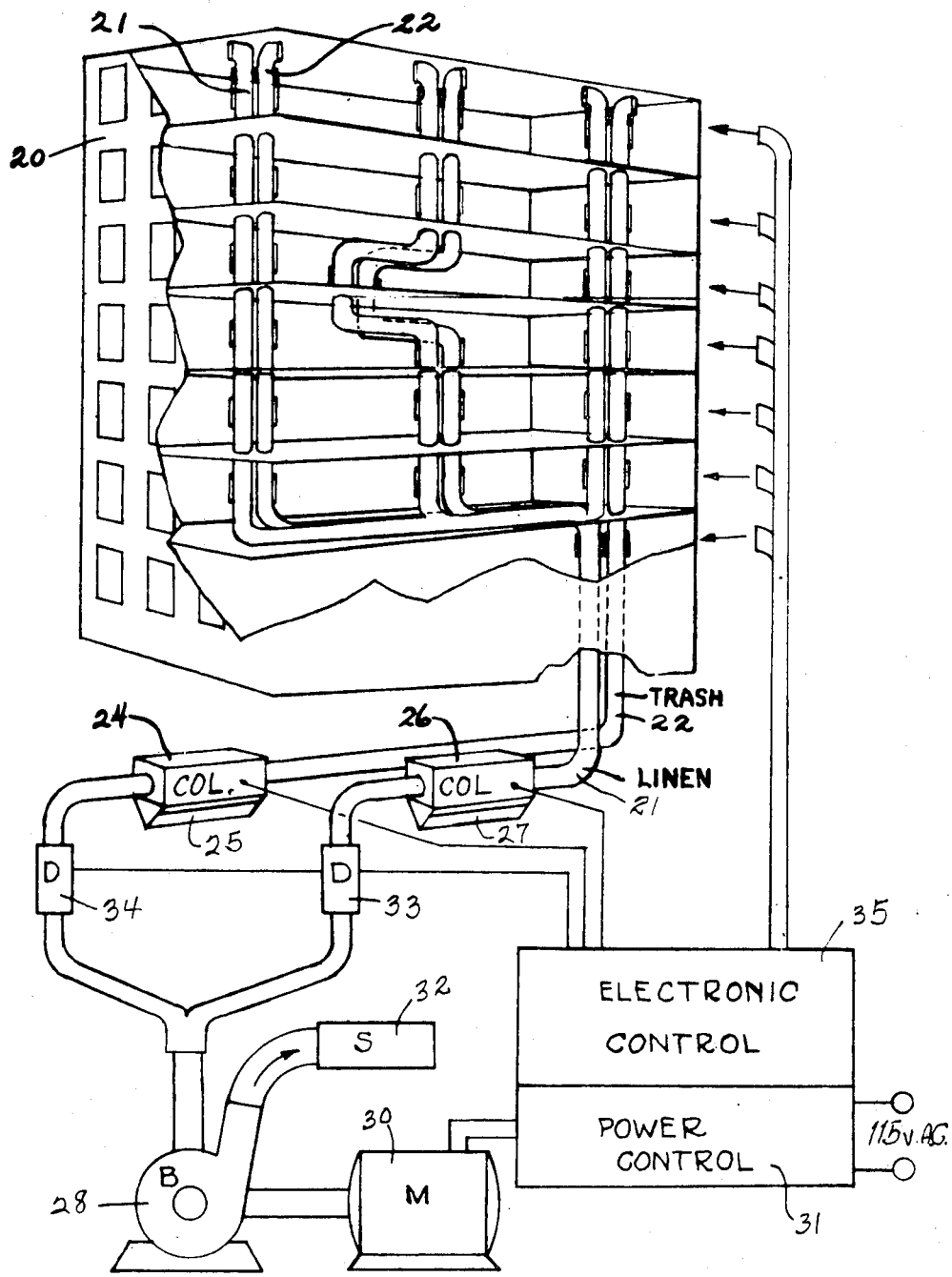
FIG. 1 is a perspective view of a building showing a double system of ducts, two collection containers and a single power blower.

Referring first to FIG. 1, a complete collector system is shown in a building 20, having a plurality of collection stations, a separate chute 21 for linen and an additional similar chute 22 for trash. At the upper end of each chute the end is open to the atmosphere but a damper 23 (shown in greater detail in FIG. 2) is positioned adjacent the end and is normally closed when a package is to be sent through another branch chute. Only one damper 23 is left open during a package transfer operation so that the atmospheric pressure may act above the package and force it along the length of the chute.

In the basement of the building 20, or in an adjacent building, a trash collector 24 is mounted for receiving all the bundles propelled through chute 22. The collector 24 is provided with an air-transmitting baffle (not shown) for arresting the motion of all the bundles and two bottom doors 25 are provided for releasing the bundles after a collection period. In a similar manner the linen chute 21 is terminated by a linen package collector 26 having two bottom doors 27, also for releasing the linen bundles after a collection period. A blower 28 or other type of vacuum pump, is positioned downstream of the two collectors and is powered by an electric motor 30 controlled by a control circuit 31. A silencer 32 is preferably added to the output pipe from the blower 28.

During the operation of this system, the contents of only one station is admitted to the chute system during any one operating time interval. When a package is being sent through the linen chute 21 to collector 26, damper 33 is opened to permit passage of air and damper 34 is closed to apply all the blower force to a single operating chute. The reverse is true when a package is being sent through the trash chute 22; the linen damper 33 is closed and the trash damper is opened. The electronic control circuit 35 is shown in block FIGS. 1 and 2, with detailed circuitry shown in FIGS. 7 through 14.

FIG. 2 shows a collection system similar to FIG. 1 but using single chutes for both the linen and trash. As shown in this figure a deposit station comprises two doors or gates 36, 37, one for linen and one for trash with a push button for each system. The combination gate (shown partly in section in FIG. 2) includes an upper damper 23 terminated by a screened input pipe otherwise open to the atmosphere. Deposit doors 36 and 37 open to storage spaces 38 and 40 where packages may be stored for a short time to await a start signal. When a start signal is received, an inner door 41 or 42 is dropped, by power means to be described later, and the package is sucked into the connecting chute 43 and sent on its way to the basement collection center.

The path of a linen package from space 38 to the collector 26 is through chute 43 and air valves 44 and 45, then through horizontal conduit 46 to a second air valve 47 and then into the linen collection center. It is obvious that two dampers can be substituted for each air valve. From the above description of FIGS. 1 and 2 it will be obvious that the electronic control circuit must control the motion of a package so that it must not start its journey until the chutes are all clear, the outer door must be closed, all the dampers are arranged for free passage into the proper collection container, and no other package can start until the chute is clear again.

FIG. 3 is a side view of an outer door 36, having hinges 36A, and a handle 36B. A concealed door switch 36C (FIG. 4) is added to insure that the outer door is closed before the package is released by the inner door 41. These switches 36C are shown in the circuit of FIG. 7. After the bundle has been deposited in space 38 and the outer door 36 closed, the operator pushes either the trash button 48 or the linen button 50. This starts a sequential cycle which begins with the inner door 41 dropping to the position indicated by dash lines in FIG. 4. The control circuit at once sets the dampers along the chute to guide the package to its proper collector, and other dampers in the system are set to apply atmospheric pressure only to the chute path carrying the package. After an allotted time interval, a reset signal is generated which resets all the circuits, and the system is ready for another package.

The inner doors 41 are coupled to a crank arm 51, the end of which is connected to a piston rod 52 and a piston cylinder 53. The piston cylinder 53 is connected to an input pipe 54, controlled by a valve 55 which leads to a source of compressed air (not shown). The valve 55 is opened and closed by a solenoid core within a winding 56. This arrangement provides a powerful rotating force for operating the inner door, controlled by a small control current generated in the electronic control circuit 35.

GENERAL CIRCUIT DESCRIPTION

The electronic control circuit 35 is shown in block form in FIG. 6 and includes a manual push button switch 50, a memory circuit 57, a timer circuit 58, a control circuit 60, a station driver circuit 61 for operating the inner doors at the deposit stations and damper driver circuit 62 for operating the air dampers, in line dampers, material switches, the blower, and the collector. The driver circuits are connected to operating solenoids 56, 63 which open and close air valves connected to pistons 53. For clarity only one push button 50 is shown in FIG. 6. For a sixteen station arrangement of chutes there will be 32 push buttons, 16 for linen and 16 for trash. The memory circuit 57 (shown in detail in FIG. 7) includes a plurality of latch circuits and coding-decoding circuits for operating other components. The output of the memory is a single conductor 64 which sends a binary coded signal to the control circuit 60 when one of the push buttons is operated. The memory circuit latches are also coupled to a reset circuit 65 which resets the latch circuits to their normal condition at the end of an operation.

The control circuit 60 (shown in greater detail in FIGS. 12 and 14) is coupled to 16 inputs of each damper driver circuit 62 so that all the damper solenoids 56 can be operated at once at the start of any operation. The control circuit 60 is also connected by 6 wires 67 to the timer circuit 58 to start the clock countdown and to conductors 68 which send binary coded signals to the station driver 61 and back to the memory circuit 57.

The timer circuit 58 contains two clocks for controlling the time interval during which the packages are allowed to travel to their collection center. The timer circuit also sends signals to the driver circuits 61, 62 to operate solenoids 63 and 56. At the end of an operation a reset signal is applied to the memory circuit 57 over conductor 69 to normalize the circuit.

Figure 9:
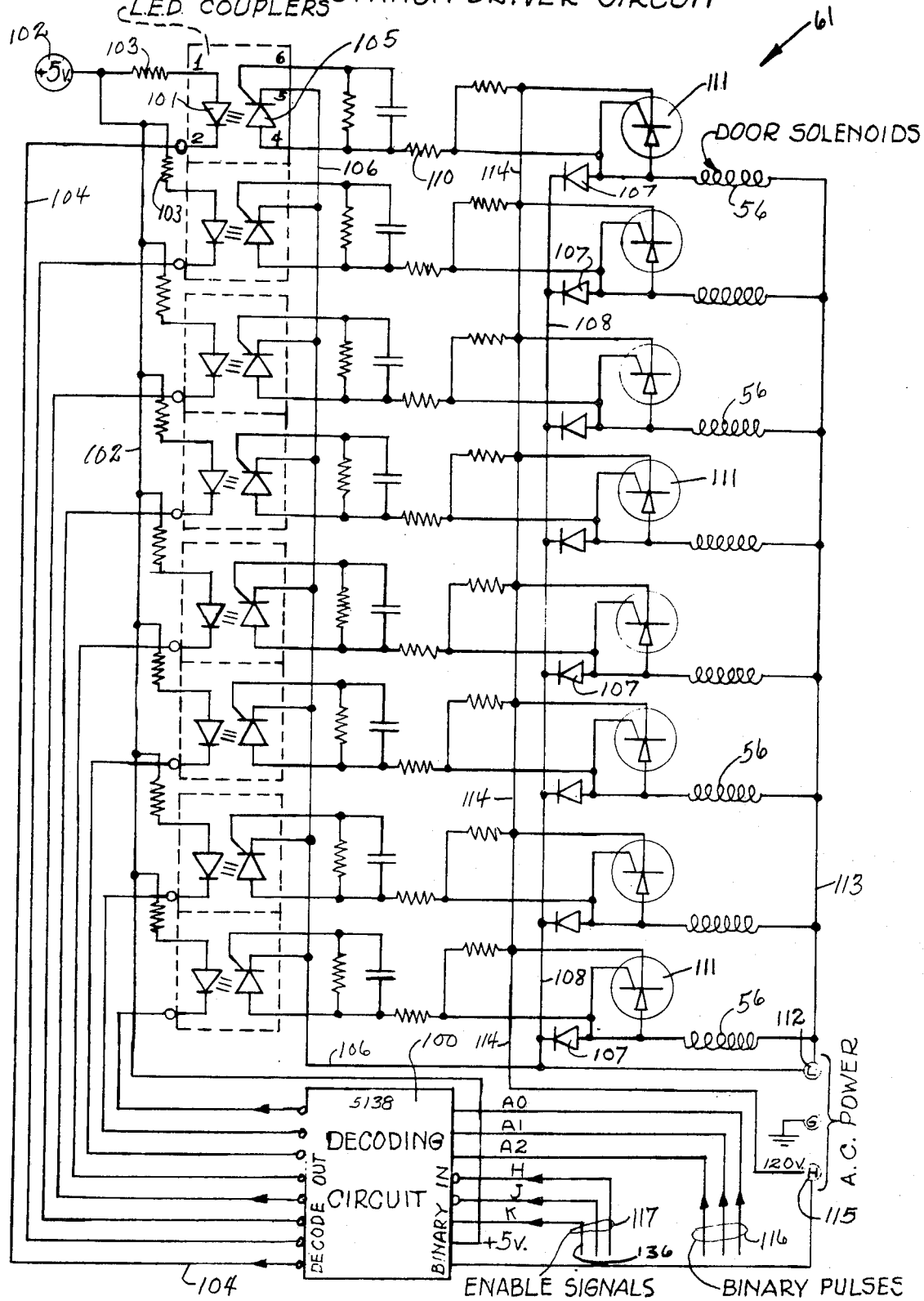
FIG. 9 is a wiring diagram of the station driving circuit showing eight output solenoids, each for operating an inner gate.
Figure 10:
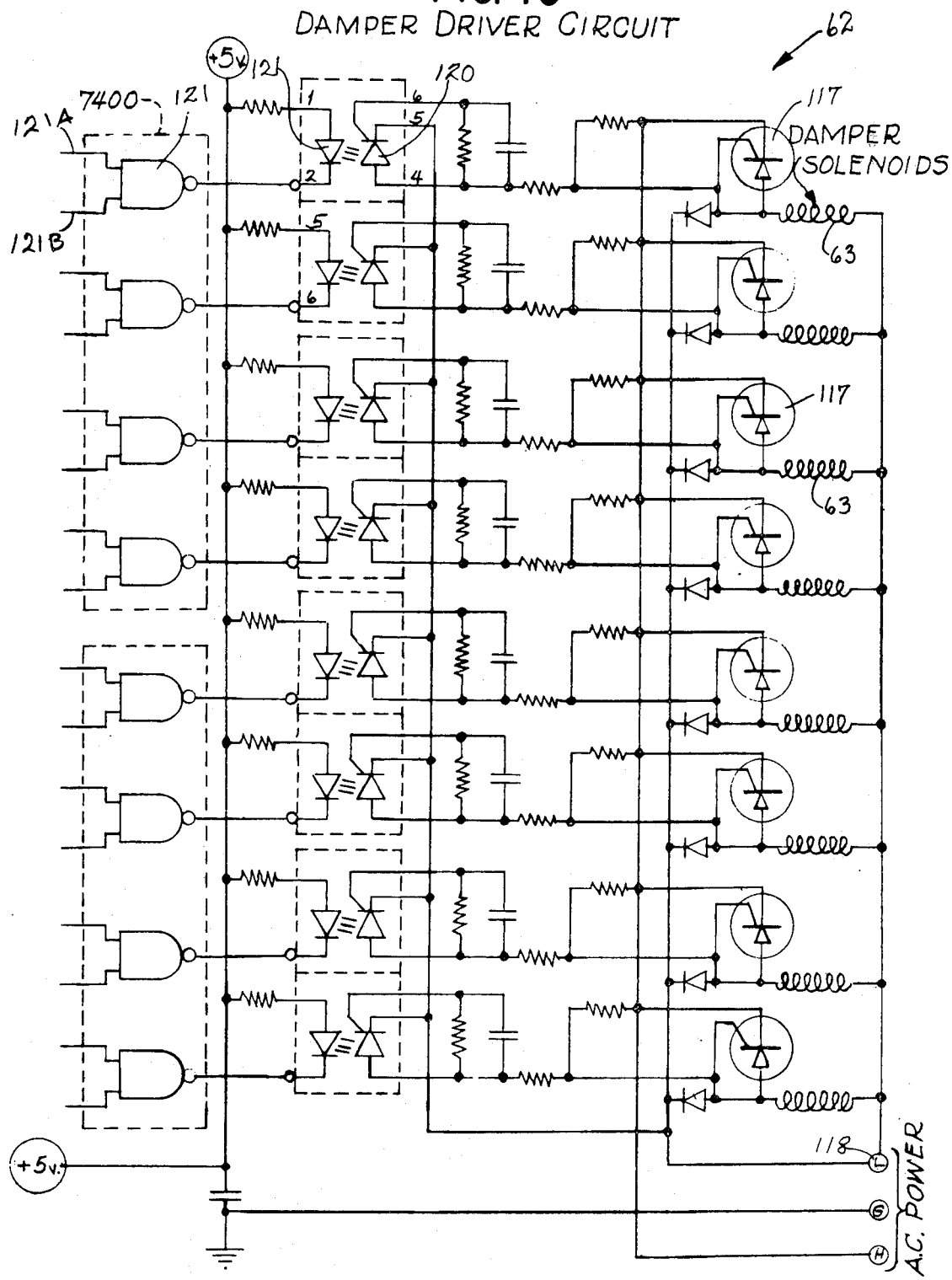
FIG. 10 is a wiring diagram of the damper driver circuit, similar to FIG. 9 but having a different input circuit. Eight output solenoids are activated, each for operating a damper or air valve.

The two driver circuits 61 and 62 are shown in detail in FIGS. 9 and 10. They are similar and each circuit includes a series of optical couplers between a decoding circuit and eight solenoids. The damper driver circuit includes an input circuit including a series of "NAND" gates which permits the operation of a solenoid only if two input signals are received.

The operation of this circuit will be described in detail later. When push button 50 is depressed, a latch circuit in the memory 57 is operated, the control and timer circuits are activated and one of two clocks is started running. The station driver circuit 61 opens the inner station door 41 (if no other operation is in progress) and the package is sent on its way. Simultaneously, a programmed selection of dampers are operated to open the correct chute path to the collector and to close off all the other chutes not needed. At the end of the operation, when the clock in the timer circuit has run its course, a reset signal is sent to the memory circuit 57 and the operating signals to the driver circuits 61, 62 so the entire circuit is completely normalized.

DETAILED DESCRIPTION OF CIRCUITS

FIG. 7 shows the details of one cell of memory circuit 57 and, for the sake of clarity, also shows 8 push button switches 50 which are mounted adjoining the outer doors 36. One side of each switch is connected to ground and the other side to the midpoint of a voltage divider including resistors 70, 71. Resistors 70 are connected to a positive source of potential (5 volts) while each resistor 71 is connected to an input terminal of a latch circuit 72. A capacitor 73 is connected between the input terminal and ground making this array a delay circuit which effectively removes transient voltage spikes and other transients from the latch circuit 72. When the push button 50 is manually depressed, it is always held in the contact position for many microseconds, long enough to depress the voltage input at the latch terminal to an operating valve. The delay circuit, 70, 71 73 eliminates inductive spikes and other noise pulses so that they do not operate the latch circuit 72 unless the switch 50 is closed. The latch circuits 72 are not shown in detail since they are well known in the art and have been used in computer circuits for many years. When a latch circuit is triggered to convert it to a latch condition, the circuit remains in that condition until reset by a pulse applied to another terminal 74. While in the latched condition, the circuit 72 sends an altered voltage over output conductor 75 to an encoder circuit 76 and this circuit sends an output control signal over conductor 64 to the control circuit shown in FIG. 14. Although more than one station may be activated simultaneously, the control system will service only one station at a time. Each memory latch circuit corresponding to the other stations will remain in the latched condition until it is that station's turn to be serviced.

Figure 8:
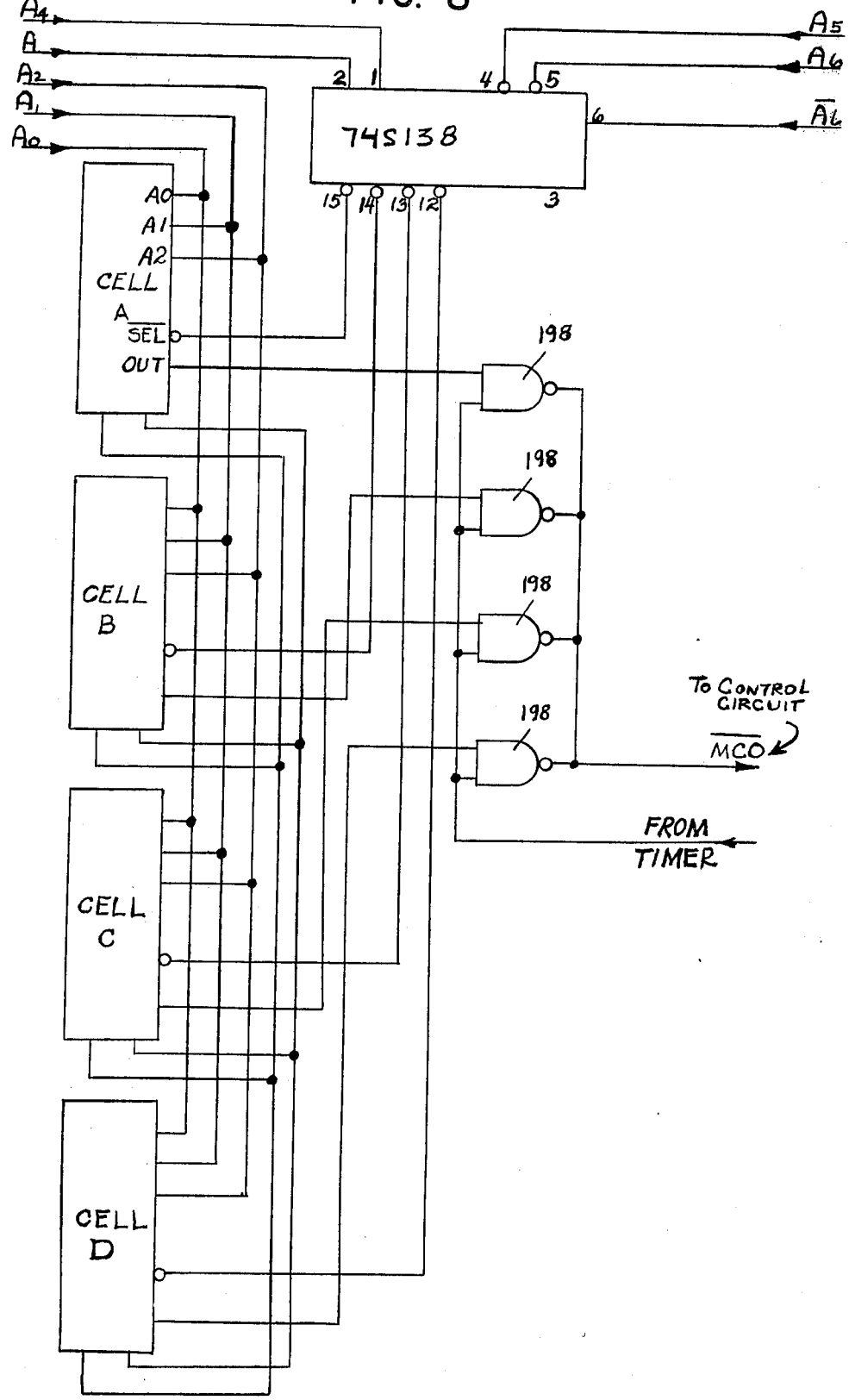
FIG. 8 is a schematic wiring diagram of four memory circuits, indicating the manner in which they are coupled to each other and to a common output.

The circuit shown in FIG. 8 is a block diagram showing four cells A, B, C, and D, each cell containing all the circuit components shown in FIG. 7. Each memory printed circuit card of the subject control system contains four cells; hence each memory card is able to handle 32 stations (eight stations per cell, four cells per card).

Referring to FIG. 12, two clock circuits are illustrated. The first is controlled by a free running multivibrator 125 and produces pluses of 0.5 millisecond spacing, available at terminals CLK-A and $\overline{\text{CLK-A}}$. Signals generated by this circuit are used by several other control circuits. The primary signals are also applied to two flip-flop circuits 126 and 127 producing pulses of 1 millisecond and 1 second. A second free running multivibrator 128 is employed to energize flip flop 127.

The control printed circuit card is shown in FIG. 14. In essence, the circuitry on this card forms the heart of the entire system. Chips 155 are binary counters which count from 0 to 127, corresponding to the maximum range of deposit stations. These counters form the basis of the station address system. Clocks A and C, via gates 161 and 162, control the time spacing between counts of counters 155.

As indicated above, the control card includes a programmable member, unique to each system, which operates the system in accordance with the specific requirements of a particular application. The programmable member is a PROM (Programmable Read Only Memory) 151. Initially, all the outputs of the PROM are zero. Once the design engineer knows the particulars of the specific application being designed, i.e., the number of stations, whether they are linen or trash stations, the number of in line dampers, etc., he programs the PROM to have a specific output for a particular input. This will be described in greater detail infra.

In operation binary counters 155 count from 0 to 127 forming 128 outputs or station addresses for each complete cycle, each output having 7 bits $A_0$ to $A_6$. As each 7 bit output is produced it is relayed to the encoder 76 of the memory circuit (See FIG. 7). The encoder 76 is in effect steered by the binary data bits so as to "look at" a particular latch circuit 72 to determine whether any press button 50 has been pressed (See FIG. 7).

When counters 155 produce a station address that corresponds to a station that has been activated, memory card encoder 76 will "look at" the activated latch circuit 72 and the memory circuit will create an output along conductor 64 (See FIG. 7) which goes to the control card to flip-flops 160 and 170 (See FIG. 14) via NAND gates 198 (FIG. 8). As the $\overline{\text{memory}}$ signal goes through flip-flop 160 it creates the $\overline{\text{Active}}$ signal which goes through gate 162 and stops counters 155. The output of counters 155 at this time is the address of the station that has been activated.

It should be noted that while counters 155 are producing a seven bit binary station address, counters 152, 153 are producing an equivalent decimal station address $R_0$ to $R_8$ which is fed into a digital readout.

The $\overline{\text{memory}}$ signal also goes through flip-flop 170 and gate 171 activating binary counter 154. Counter 154 counts from 0 to 7 producing eight outputs, each having three bits CSA, CSB, and CSC (000 to 111). The time spacing between counts is controlled by clock A which also sends a signal through gate 171 to counter 154. Each three bit output CSA, CSB, CSC goes through decoder 148 to produce eight outputs $CS_0$ to $CS_7$.

Referring to the PROM 151, it is apparent that it has a ten bit input comprising least significant bits CSA, CSB, CSC, and the seven bit station address $A_0 - A_6$. Although the PROM has only four outputs for any given input, it can be appreciated that for each station address there will be eight different inputs as the values of CSA, CSB, and CSC change in accordance with counter 154. Thus, the PROM 151 in effect, has 32 outputs per station address, the outputs being programmed into the PROM by the design engineer in accordance with the specific requirements of the particular application. The 32 PROM outputs are loaded sequentially, four outputs at a time, into latching circuits 150-1 through 150-8 in accordance with counter 154. More particularly, when count 154 is at 0, i.e., CSA, CSB, CSC, are 000, signal $CS_0$ is created which in turn activates latching circuit 150-1 for receiving the particular four outputs of the PROM. When counter 154 steps up the count to 001, signal $CS_1$ is created, which in turn activates latching circuit 150-2 for receiving another four outputs from the PROM. This loading cycle continues until all the latching circuits 150-1 through 150-8 have been loaded with data outputs from the PROM. It can be appreciated that if more than 32 control outputs are desired, another PROM may be added to the circuit as well as additional latching circuits and counters.

In the preferred embodiment of the subject invention, latching circuit 150-1 is used as a master latch, and has outputs $LR_0$, $LR_1$, $LR_2$ and $LR_3$. As a matter of convenience, the inverse of these signals, i.e., $\overline{LR_0}$, $\overline{LR_1}$, $\overline{LR_2}$ and $\overline{LR_3}$ are also brought out. In the preferred embodiment the state of $LR_0$ determines whether a particular station is a trash or linen station. The state $LR_1$ determines whether the station is automatic feed* or standard fully pneumatic station. The state of $LR_2$ determines which travel time is to be used. As will be described below with respect to the timer circuits, the control system is provided with two travel times. Stations which are close to the blower use a short travel time A while stations farther from the blower use a longer travel time B. It can be appreciated that the provision of more than one travel time makes the subject system much more efficient than existing systems which use only one travel time. In addition, because of the flexibility of the system, the duration of the travel times can be easily selected. Output $LR_3$ is used for special applications. The outputs of latches 150-2 to 150-8 are connected to the damper driver circuits (See FIG. 10) for operation of the individual in line dampers, the material switches, the blower damper, the collectors, etc.

\* Automatic feed station is one which operates in an existing gravity chute as opposed to a fully pneumatic chute. It has a different timing cycle from the standard station.

After latches 150-1 to 150-8 have been loaded, signal $CS_7$ is fed to flip-flop 159 which resets counter 154 and creates signal $FF_2$.

Figure 11:
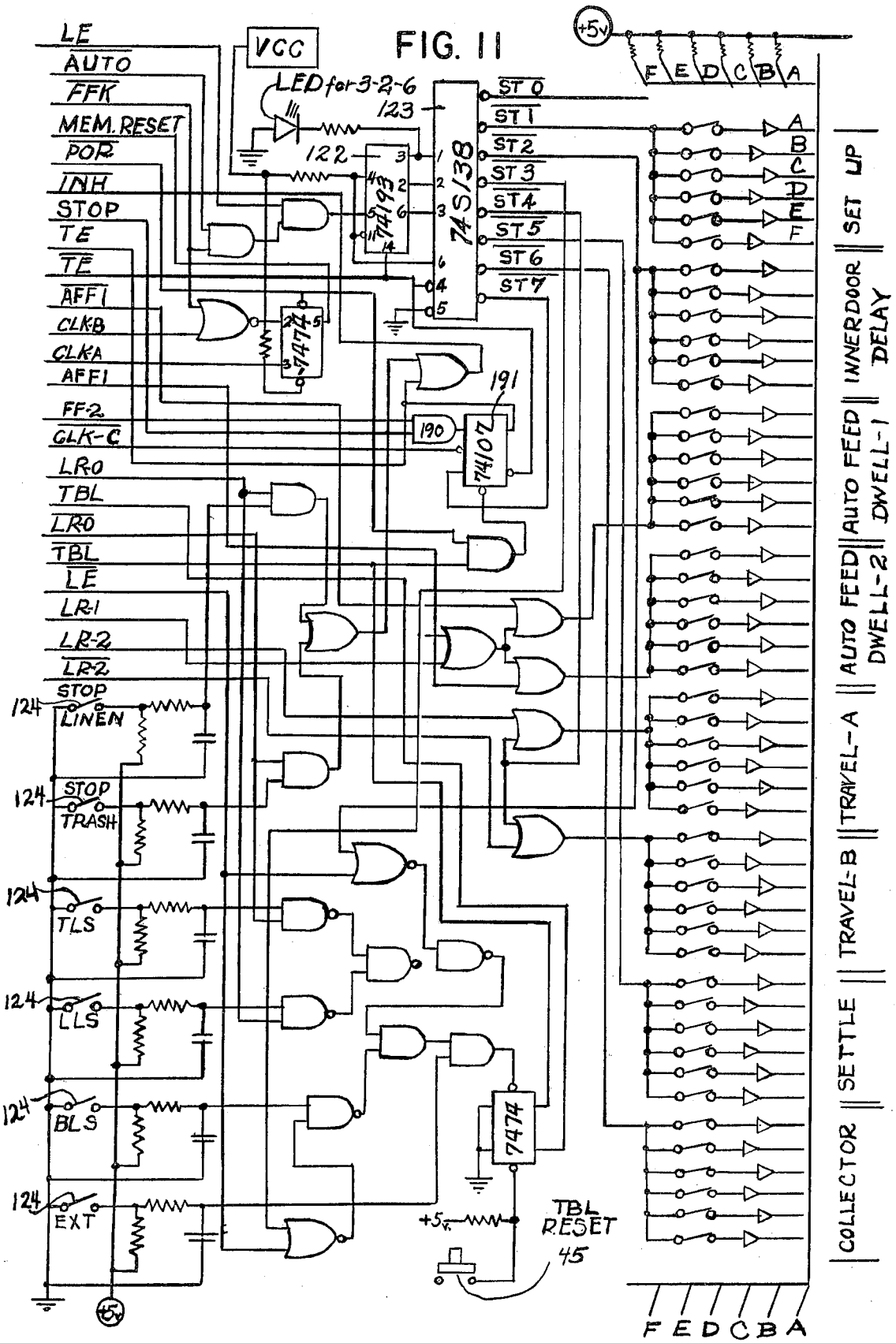
FIG. 11 is a wiring diagram of one portion of the timer circuit showing some control circuits.

Referring to FIGS. 11 and 13 there is illustrated the circuitry making up the timer cards for the subject system. All the input lines are shown at the left side of the figure with designations indicating their origin. A more detailed description of these circuits is shown in the following table:

| | |
|---|---|
| VCC | +5v. D.C. voltage supply |
| ST-0 to ST-7 | Timed Enabling States |
| TE | Timer Enabling Circuit |
| INH | Timer Inhibit |
| MEM. RESET | Memory Latch Reset |
| TBL | Trouble Out |
| RESET | Trouble Reset |
| TLS | Trash Limit Switch |
| LLS | Linen Limit Switch |
| BLS | Blower Limit Switch |
| EXT | External Trouble Input |
| ILD | Inline Damper Time Signal |
| ID | Inner Door Time Signal |
| BD | Blower Damper Time Signal |
| CT | Collector Timer Signal |
| LE | Timer Load Enable |
| AF | Derived Clock Signal |
| AUTO | Auto Feed Enable |
| AFFI | Auto Feed Dwell Select |
| D1 | Dwell Cams Closed |
| D2 | Dwell Cams Open |
| BOR | Borrow Signal |
| CLK A | Clock Pulses .5 MSEC. |
| CLK B | Clock Pulses 1 SEC. |
| CLK C | Clock Pulses 1. MSEC. |
| CS-0 to CS-7 | Output Latch |
| CSA, CSB, CSC | Select Address Conductors |
| A0 - A6 | Station Address Conductors |
| R0 - R8 | Digital Readout Address |
| POR | Reset Signal |
| PRI | Priority Station Input |
| LR-0 to LR-31 | Latch Outputs |
| MCO | Memory Circuit Output |
| ACTIVE | Scan Inhibit Signal |
| HOLD | Active Overide Signal |
| FFK | Memory Reset Enable |
| FFK2 | FFK Enable Signal |
| ACH | 120 Volt Power Terminal A.C. |
| ACL | Power Neutral Terminal |
| EN-1 to EN-8 | Station Driver Enable |
| TIM B | Memory Reset Input. |

NOTE: A bar across any designation indicates an inverted signal pulse.

All flip flop, counting, and decoding circuits are shown in the figures as oblong boxes with the circuit number in the box. These numbers are well known to all those who are well versed in the art and further information can be found in the TTL Data Book published 1976 by the National Semiconductor Corp. For convenience, a list of the integrated circuits used in this control arrangement is given in the following table:

| | |
|---|---|
| 556 | Free Running Multivibrator |
| 7474, 74107 | Dual Flip Flop |
| 74193 | Up-Down Binary Counter |
| 74S138 | Decoder with enable circuit |
| 7475 | Four Bit Latching Bistable M.V. |
| 74123 | Monostable Multivibrator |
| 74192 | Up-Down Counter |
| 7400 | Quad Two Input NAND Gate |

Signal FF2 from the control card goes through gate 190 and flip-flop 191 (FIG. 11) thus producing signal TE. Signal TE goes through gate 192 and flip flop 193 (See FIG. 13) producing signal LE which enables counter 122 and decoder 123 (FIG. 11). Counter 122 counts from binary 0 to 7 (000–111) and decoder 123 decodes the counts or outputs into 8 sequential outputs $\overline{ST_0}$ through $\overline{ST_7}$. Outputs $\overline{ST_1}$ through $\overline{ST_6}$ sequentially enable a series of switch banks which are wired to produce time cycles in accordance with the specific requirements of the particular application to produce a six bit output A through F. Outputs A through F are fed into counters 194, 195 (See FIG. 13) which physically count down the time for each state $\overline{ST_1}$ through $\overline{ST_6}$. It should be noted that the switch banks connected to output $ST_4$ of counter 123 create travel times A and B. The actual length of these times is dictated by the position of the specific switches. The state of control latch output $LR_2$, which has been programmed into the PROM by the design engineer, determines which travel time will be used for a particular station.

As timing cycles progress, signals $\overline{ST_1}$ through $\overline{ST_7}$ are fed into four dual flip-flop circuits 131, 132, 133, and 134. The flip flop circuits act as temporary latching circuits and their output pulses are applied to the damper driver circuit over conductor ILD 135 to the inline damper control; then over conductor ID 136 to control the inner doors; over conductor BD 137 to control the blower damper; and finally over conductor CT 138 to control the collector door. All the above control means are coupled through a solenoid valve and a compressed air operated piston and will be described infra. The flip flops 131 through 134 are normalized by pulses sent through AND gates 140 and 141 from the trouble conductor 142 (TBL) and the reset conductor 143 ($\overline{POR}$). Switches 144, counter 145, and flip flops 146 and 147, create the necessary timing for an Automatic Feed cycle.

The timer circuit of FIG. 11 is also provided with a series of disable switches 124, which monitor certain essential functions, and will disable operation of the control system in the event of a malfunction. A reset button 45 is provided to reactivate the system once repairs have been made.

FIG. 9 is a schematic diagram of connections of the station driver circuit 61 which receives one or more signals from the timer circuit 58 and a seven bit binary address signal from the control circuit 60, decodes these signals in a binary decoder 100 and applies the result to a selected light emitting diode (LED) 101. FIG. 9 in fact illustrates one half of the circuitry on a typical station driver card, each half being identical. Eight LED couplers are shown, each coupled through an optical coupling means to an inner door solenoid 56 which opens the inner door 41 (FIGS. 4 and 5). The LED components 101 are powered by a source of potential 102 of 5 volts, each connected in series with a resistor 103 and connected to a signal line 104 from the decoding circuit 100. Each LED 101 is mounted adjoining a light sensitive silicon controlled rectifier (SCR) 105 and controls its conduction by the light pulse emitted from its junction. Each SCR 105 has its cathode connected to a common supply line 106, a series of diodes 107, joined by a common conductor 108 and an inner door solenoid 56. The SCR anodes are each connected to a limiting resistor 110 and the firing electrode of a power SCR 111, whose anode and cathode are connected in series between a power A.C. terminal which can be traced from the A.C. terminals 112 to common conductor 113, then through any of the door solenoids 56, SCR components 111, and back over common conductor 114 to the other terminal 115.

The signals for selecting the proper LED and its coupled door solenoid are received over binary conductors 116 as soon as the operator depresses button 50 but the door opening is delayed until enabled by the signal from ID 136 (FIG. 13), transmitted over one of conductors 117.

FIG. 10 shows the wiring diagram of the damper dirver circuit, eight solenoid arrays of which are indicated. The actual number required depends upon the length of the chutes, their number and the complexity of the installation. It should be noted that in fact FIG. 10 illustrates one-half of the circuitry on a typical damper driver card, each half being identical. It is assumed that, under normal conditions all upper terminal dampers 23 (FIG. 2) are open and all the inner doors are closed. Then, when a package is to be sucked into a chute, the inner door 41, under the package, is opened and the package falls into the chute 43. Simultaneously, all dampers, except those in the conveying path, are closed, and full atmospheric pressure is applied to the chute and the package to draw it to its collection center. The damper driver circuit is similar to the station driver circuit, each damper being driven by a piston within a cylinder and actuated by compressed air controlled by a solenoid operated valve. The damper solenoids 63 (FIG. 10) are connected in series with an SCR 119 and a source of high voltage 118. The gate electrodes, as before, are coupled to a light sensitive SCR 120 and activated by a light emitting diode (LED) which receives a control pulse from a NAND gate 121. An operating circuit may be set up by the application of a pulse from a control circuit output LR4–LR31 to a NAND gate over conductor 121A and then, several seconds later, by the application of a second or timing pulse (ILD, ID, BD, CT from the timer circuit of FIG. 13) over conductor 121B. Only when both a control circuit output signal and a timing signal are simultaneously applied to a NAND gate 121 will there be an output for the damper driver circuit.

In summary, the subject invention provides a new and improved electronic control system for operating a pneumatic trash and linen network. Unlike existing systems, it is not a custom wired system for each particular application. Rather, the circuitry from application to application is substantially universal. The system employs printed circuit boards which are interchangeable within the same type of circuitry, i.e., all the memory cards are identical, all the station driver cards are identical, etc. In essence, the only difference in circuitry from application to application is in the outputs programmed into the PROM of the control circuit.* Because of the system's universality and programmability, modifications and additions can be easily made without the need of complex and cumbersome wiring, and without the need of expert technicians. In addition, the circuitry of the subject system enables the use of a plurality of travel times whereby the system operates under utmost efficiency. Known systems can practically provide only one travel time.

*Of course the timer cards differ in the setting of the switch banks for time cycles of each application.

The subject invention also includes a station address system whereby stations may be multiplexed, thus increasing the capabilities of the system while decreasing the space needed to accommodate the circuitry. The panel enclosure for a relay system having on the order of 20 stations must be aproximately four times as large as an enclosure for the subject system accommodating 128 stations. The subject system also represents an economy in space with respect to known solid state systems. Known solid state systems can accommodate only eight stations per printed circuit card. The subject system, however, can handle up to 32 stations per printed circuit card. Because of the economics with respect to space, wiring, and expert labor the subject system represents a 50% savings in costs as compared to known relay systems. Though not as high, costs saved with respect to known solid state systems are also substantial.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. A pneumatic network for conveying packages said network including:
    a system of generally cylindrical ducts connected to each other for conveying the packages therethrough;
    a deposit station at an entrance end of each duct for receiving and preliminarily storing the packages to be conveyed, said deposit station having an inner door for admitting the packages to the duct system;
    a first collection center connected to a delivery end of the duct system for receiving a first group of packages after they have been conveyed through the duct system;
    a second collection center connected to the delivery end of the duct system for receiving a second group of packages after said second group of packages has been conveyed through the duct system;
    an evacuation pump connected to the duct system for drawing air through the duct system to move said first and second groups of packages toward their respective collection center;
    control means for connecting all of said deposit stations, and for operating all of the deposit station doors, and for selectively directing packages of the first and second groups to their respective collection centers, said control means comprising:
        sequential memory circuit means for recording therein the order in which the packages are directed to a deposit station;
        station driver circuit means for operating all of the deposit station doors;
        damper driver circuit means for selectively directing packages of the first and second groups to their respective collection center;
        timer circuit means for providing a predetermined time interval for the packages to move from the deposit station to their respective collection center; and
        control circuit means for selectively operating said memory, driver, and timer circuit means;
        said memory circuit means including a plurality of latch circuits which are activated to a latched condition by a manual push button at one of the deposit stations, said latch circuits being connected to the timing circuit means for return to an unlatched condition when a predetermined time interval is ended, said memory circuit means further including first encoding means for converting decimal information into binary information to be sent to the control circuit means and first decoding means for converting binary information into decimal information for resetting said memory circuit means after the packages have been conveyed to their respective collection center;
        said control circuit means including a programmable member, the outputs of said programmable member being programmed to operate said system in accordance with a particular application, said control circuit means further including a first binary counting means for creating a binary address for each deposit station, the outputs of said first counting means forming a fixed input to said programmable member, the outputs of said first counting means being connected to said memory circuit means for sensing which deposit station is activated, said control circuit means further including a second binary counting means the outputs of said second binary counting means forming a variable input to said programmable member whereby for every change in the output of said second counting means, the input and output of said programmable member also changes, the outputs of said second binary counting means being applied to a second encoding means for creating an output for sequentially activating a plurality of latching circuits for sequentially receiving the output signals of said programmable member, the outputs of said programmable member being connected to said timer circuit means and said damper driver circuit means for controlling the conveyance of the packages through the network, said control circuit means further including a decimal counting means connected to said first binary counting means, the outputs of said decimal means being applied to a digital readout means;
        said timing circuit means including at least two timing combinations producing two predetermined time intervals;
        one of said intervals controlling the travel of packages through a first distance;

the other of said intervals controlling the travel of packages through a second distance, longer than the first;

said damper driver circuit means being connected to said timer circuit means and said control circuit means by means of an NAND gate, said damper driver circuit means having an output only when both a signal from said timer circuit means and a signal from said control circuit means is applied to said NAND gate;

said station driver circuit means including a second decoding means for receiving binary signals from the output of the first binary counting means of said control circuit means, as well as a signal from said timer circuit means, said second decoding means converting said binary signals to a decimal signal for operating the station door of a predetermined deposit station;

the respective circuit means of said control means being substantially universal from application to application, the programmable member of the control circuit means being unique to each particular application whereby the network operates in accordance with a particular application.

2. A pneumatic network for conveying packages as recited in claim 1 in which there are separate chutes and deposit stations for the packages of the first group and the packages of the second group.

3. A pneumatic network for conveying packages as recited in claim 1 in which a delay circuit means is connected between the input of the memory circuit means and ground for preventing transient voltages from affecting the latch circuits of said memory circuit means.

4. A pneumatic network for conveying packages as recited in claim 1 wherein for each programmable member there are 32 outputs per deposit station.

5. A pneumatic network for conveying packages as recited in claim 1 in which the timer circuit means includes a series of disable switches for ceasing operation of the control means when a malfunction occurs.

6. A pneumatic network for conveying packages as recited in claim 1 in which the memory circuit means includes thirty two latch circuits.

* * * * *